United States Patent [19]

Domike et al.

[11] 4,101,959
[45] Jul. 18, 1978

[54] TERMINAL DISPLAY AND STORAGE SYSTEM

[75] Inventors: Donald A. Domike, Encino; Bryon M. Cole, Venice; Richard A. Matthews, Los Angeles, all of Calif.

[73] Assignee: Informer, Inc., Los Angeles, Calif.

[21] Appl. No.: 735,061

[22] Filed: Oct. 22, 1976

[51] Int. Cl.² .......................... G06F 3/04; G06F 3/14
[52] U.S. Cl. .................................................. 364/200
[58] Field of Search ............................... 358/93, 903; 364/200 MS File, 900 MS File

[56] References Cited

U.S. PATENT DOCUMENTS

| | | | |
|---|---|---|---|
| 3,194,880 | 7/1965 | Weingart | 358/93 |
| 3,277,444 | 10/1966 | Masters | 364/200 |
| 3,580,993 | 5/1971 | Sandorf | 358/93 |
| 3,624,604 | 11/1971 | Gibbard | 364/200 |
| 3,636,520 | 1/1972 | Berteau | 364/200 |
| 3,674,924 | 7/1972 | Fischer et al. | 358/93 |
| 3,778,781 | 12/1973 | Roth | 358/93 |
| 3,868,478 | 2/1975 | Zeenkov | 358/93 |

*Primary Examiner*—Harvey E. Springborn
*Attorney, Agent, or Firm*—George F. Bethel; Patience K. Bethel

[57] ABSTRACT

A terminal display incorporates a cathode ray tube (CRT) that is mounted in conjunction with a keyboard for use by an operator such as a bank clerk. Main and remote CPU's are accessed by the keyboard to provide an input for recording a signature card through a signature capture device including a television camera. The signature information in the form of the relevant bits or characters is transmitted to the main CPU for storage through a buffered system that incorporates a portion of this invention. In order to save storage space, only those relevant bits that relate to a given character designating the number of spaces is recorded in a manner whereby blanks and the appropriate number thereof are recorded as a single character form, indicating the number of blanks, thereby compressing the signature character bits substantially. After storage, the operator at the terminal is able to retrieve and display a signature that has been stored, which is then displayed on the lower portion of the CRT at the operator's remote location from the main CPU. The lower portion of the CRT is utilized in lieu of the entire CRT so that the data on the upper portion of approximately the top two thirds of the screen can be provided with an alphanumeric representation on the top of the screen and a video display on the bottom of the screen by means of a unique display timer of this invention.

17 Claims, 3 Drawing Figures

TERMINAL DISPLAY AND STORAGE SYSTEM

BACKGROUND OF THE INVENTION

1. Field of the Invention

The field of this invention is in the terminal display and accessing art for computers. In particular, the field relates to computer accessing at a remote location such as a terminal which provides information to the computer in the form of data that represents a signature on a card or other information to be displayed on the CRT of the terminal. The field can be further delineated by the ability to access a computer through a terminal, and at the same time provide a remote display of information, such as at a point of sale, bank teller's station, and other commercial and industrial display purposes wherein information that has previously been entered from the terminal is to be later displayed in the form of a video presentation after the information is captured.

2. The Prior Art

The prior art related to displays and CRT's at certain remote terminal positions generally relates to the ability of an operator to access data from a central processing unit (CPU). In particular, alpha-numeric displays are capable of being presented on a CRT for purposes of an operator analyzing or evaluating given information to be displayed thereon. The information is usually in the form of data that has been previously stored on tape, discs, or other memory means.

Recently, it has been common in point of sale displays, as well as branch banking, to provide certain information to a sales clerk or bank teller for validating or determining the character of a sale or banking transaction. In particular, it has been common for certain banking facilities to access a main computer to determine the balance of a customer's account, or the general character of the customer's account, such as credit, types of checks written, or amounts that can be drafted or drawn from the account.

One of the most sensitive areas of banking has been the verification of signatures by a bank clerk or teller. In particular, it has been customary for bank clerks to go to a particular card and compare the signature on a document, such as a check, draft, or note, whether it be issued by that branch or another branch. As can be understood, if a card is not on file at the particular branch which corresponds to the signature to be checked on the documents, such as a draft or a check, the bank clerk cannot fully authenticate the signature. The foregoing is often the case in branch banking where a customer of the bank will draw a check on his account at one branch and then cash the check at another branch which is convenient at the time. Additionally, this happens oftentimes when a check is brought in by someone other than a depositor or customer, and the signature thereon must be checked against the signature that has been represented as that of the depositor upon whose account the check is to be drawn.

In addition to the foregoing problem, it is apparent that when a bank clerk or teller has to leave his post and go through a substantial stack of signature cards, the matter becomes difficult from the standpoint of time. This lengthens the transaction, detains customers at the teller's window, and generally lowers productivity within the bank.

The instant invention allows a signature card to be implaced within a signature capture frame by a new accounts clerk or any employee of the bank. The signature is then capable of being transmitted to a main central processing unit (CPU) and stored in the form of certain characters to later provide a display of that signature.

The signature can later be displayed at a CRT remote from the CPU, at a bank teller's or clerk's remote location by merely accessing the remote CPU through a keyboard. Accessability is enhanced with respect to all branches that are connected to the main CPU through any number of interconnect lines. Thus, the signature display can be provided to any branch, regardless of whether or not they have a signature card on file, thereby enabling a teller to compare a signature on any documents received in a facile and quick manner.

As a consequence, the teller need not remove herself in any given situation from her post and at the same time can access the signature for display purposes, regardless of whether or not the signature is on file at that particular branch.

In addition thereto, this invention can also provide the added feature of allowing a video display of a signature and an alphanumeric display of information on the same screen. Thus, video as well as alphanumeric information can be provided on the same screen of a terminal. This is a distinct advantage over the prior art by allowing accessability to the alphanumeric information, while at the same time providing a display of the video representation of some previously captured set of symbols, language, or other presentation.

Enhanced operation of the invention is accomplished by conversion of video information by strobing the intensity information into a digital shift register until a byte is accumulated and then transferring that byte to the digital storage means of the CPU.

SUMMARY OF THE INVENTION

In summation, this invention comprises a buffered display and terminal system incorporating the utilization of a main central processing unit (CPU) which can be connected through transmission lines to a remote CPU in the form of a micro processor or mini computer. The mini computer or processor is connected to a series of keyboards and CRT's using its memory in a manner whereby it controls the overall function of the buffered display system. At the same time, it allows the capture of material to be displayed that is to be later stored, such as on a signature card.

More particularly, the invention incorporates a television capture unit that can receive a signature card or information of another type at a remote source. After receiving the signature card or display, the television camera can capture the material for later video display by means of the system. The signature capture system utilizes one of the keyboard portions of the system, as well as a portion of the memory for the remote CPU or processor. The remote CPU controls and handles the CRT and keyboard portions of the plurality of terminals that can be located at different stations for a bank clerk or other user, such as an operator for a point of purchase facility. The processor functions in conjunction with a display timer having a number of clocking functions therein which allow the information that is to be displayed in the form of video information to be cast upon a limited portion of the screen, as will be detailed hereinafter. The processor can be connected through transmission lines to a main central processing unit (CPU) at a master location which incorporates storage means, such as a disc or tape, in order to receive the information that corresponds to the signature that is to be displayed at a later point in time. The main CPU also has the capability of allowing the storage of other information other than the signature that is to be stored. In particular, it can store such information as alphanumeric information that corresponds to a particular account number with regard to transactions, deposits, and related matters.

The entire system, including the signature capture, the storage, and the later display thereof, can all be accessed and controlled from a remote keyboard and CRT location at a bank teller's location or new account receptionist's location. Thus, the entire system allows for remote branches to check signatures or other installations at each bank teller's or clerk's location, regardless of where the branch is, so long as it is connected to the main CPU. At the same time, it allows for signature card capture at the remote location and storage of data sought in any remote location, such as a branch bank, or for that matter, point of sale location. (The INFORMER CPMPUTER TERMINALS brochure SP 76-3, submitted as an attachment to an amendment, shows representative examples of the indicated display terminal).

As a consequence, this invention is to be read broadly over the prior art to incorporate the ability of a remote CRT and terminal to provide both alphanumeric information on one portion of the CRT, while at the same time allowing video and graphic display on the other portion of the CRT. In addition thereto, it is to be read with respect to the function of providing a display singly at a remote location of a video representation of a presentation of a particular display that corresponds to a signature which can be captured, stored, and later displayed at the same remote location. A basic provision for capturing and converting video information into digital information is utilized herein by strobing the intensity information into a digital shift register until a byte is accumulated and then transferring that byte to the CPU. As a consequence, the invention has broad application with regard to the storage of video and graphic information in a digital form. Furthermore, the signature compression technique attendant therewith adds to the flexibility and advantages thereof. Thus, this invention has broad application in both banking, as well as point of sale and other commercial and related functions where branches and remote locations are utilized in the commercial world.

BRIEF DESCRIPTION OF THE DRAWINGS

The invention will be more clearly understood by reference to the description below taken in conjunction with the accompanying drawings wherein.

DESCRIPTION OF THE PREFERRED EMBODIMENTS

Figure 1:
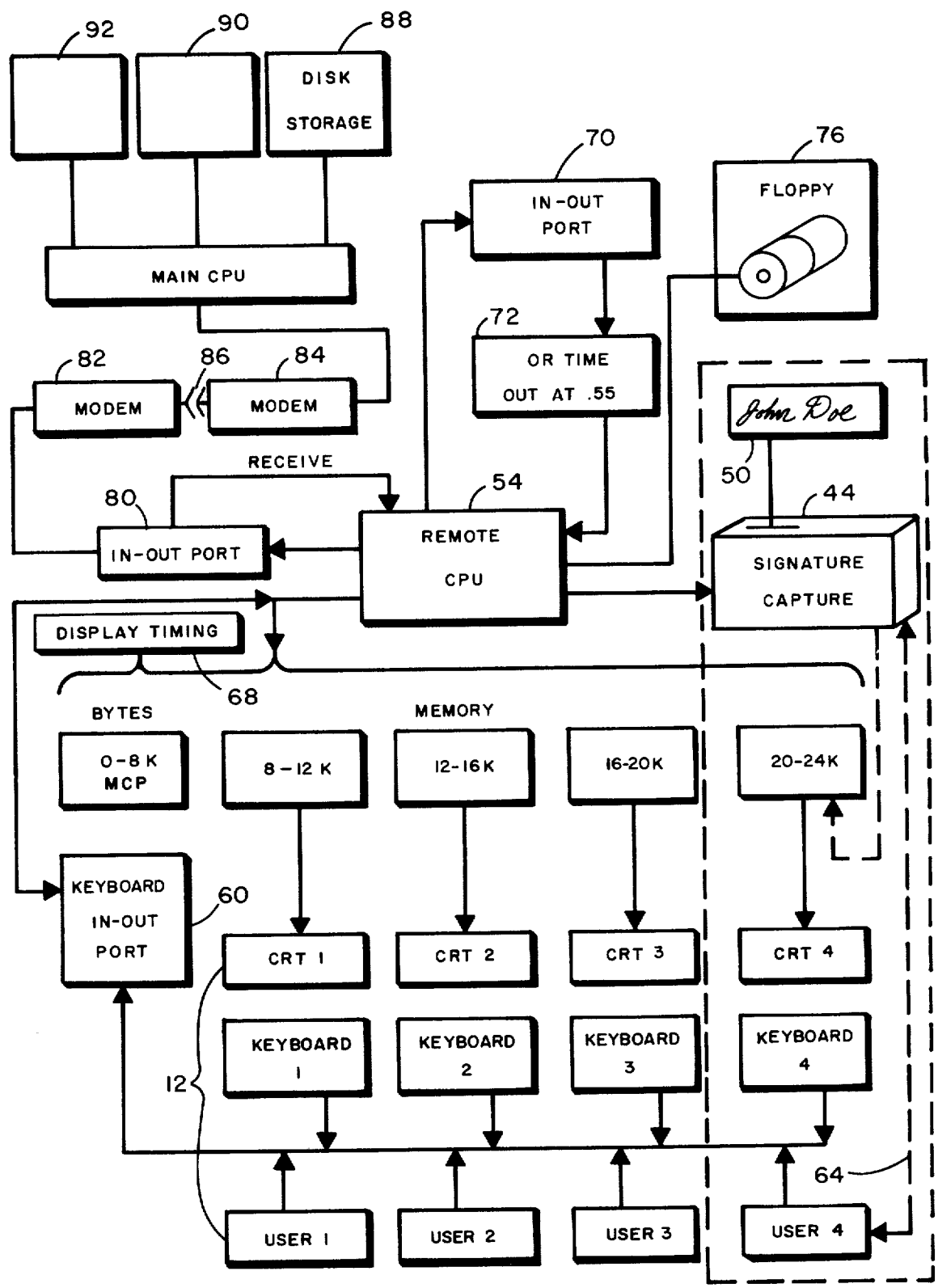
FIG. 1 shows a block diagram of the system of this invention showing the main memory and functional components thereof.

For purposes of explanation, the invention will first be described with regard to a user functioning within a framework of a bank, such as a bank teller or new accounts secretary or clerk.

As is well understood, all bank locations usually incorporate a teller having a window 10 with a counter 12 including drawer spaces 14 and the ability to screen off the public, such as a wall 16 associated therewith.

The teller's location in this given instance can incorporate a terminal 18 having a cathode ray tube (CRT) 20 associated therewith. The CRT 20 has a screen 22 that can display a signature 24 thereon. The terminal 18 incorporates a keyboard 26 which can have a number of symbols thereon, such as access symbols and special keys, as well as the letters of the alphabet and numbers thereon.

As is customary, the keyboard 26 has certain special functions and keys that will be expanded upon hereinafter. The keys on the keyboard 26 in this instance have been incorporated in a drawer 28 that slides on rails 30 within a container 34 upon which the CRT 20 is mounted on a post 36. The foregoing configuration allows for a ready access of the keyboard 26 by merely pulling on a handle 40 attached to the drawer so that it can be slid in and out of the container 34 on the rail 30.

It is not necessary to practice this invention with this particular type of terminal. However, in this particular instance, it is extremely handy and compact, particularly in consideration of the fact that a bank teller oftentimes has many operations going on at once. Thus, the compactness and elements providing easy use enhance the function of this invention when in the foregoing mode. Nevertheless, the keyboard 26 and CRT 20 can be in any particular configuration or on any particular pedestal, console, stand, or mounting other than the one as shown.

The capture means for capturing a signature 24 is shown incorporating a video or television camera 44 with a lens 48 which can be supported on a stand 46. the video camera 44 is shown focused on a signature card 50 incorporating the signature 24. However, any particular signature capture configuration can be utilized. In the given case, the signature card capture means has been shown connected to a terminal control, remote CPU or micro processor 54 which shall be expanded upon in a later description.

The camera 44 can be such that it is incorporated between the camera and the terminal controller connected by a lead 53. The camera 44 can be included with a bracket, or card holder to receive the card 50 in juxtaposition to the camera. In particular, the card can be inserted into a particular holder which has not been shown. The holder causes a triggering of the capture or signature capture means in the form of the television camera 44 which has been connected by the lead 53 to the terminal controller 54.

Any means, including the brackets or card holders as generally described hereinbefore, as well as any other means to capture the signature on the card, can be effectuated. However, for purposes of illustration, the simplest embodiment in the form of the camera 44 and the card 50, has been shown. The signature capture means, or camera 44 can usually be located at the new accounts desk or in the case of a small bank, which is often the case, at a window of a particular teller that is responsible for new accounts.

Figure 2:
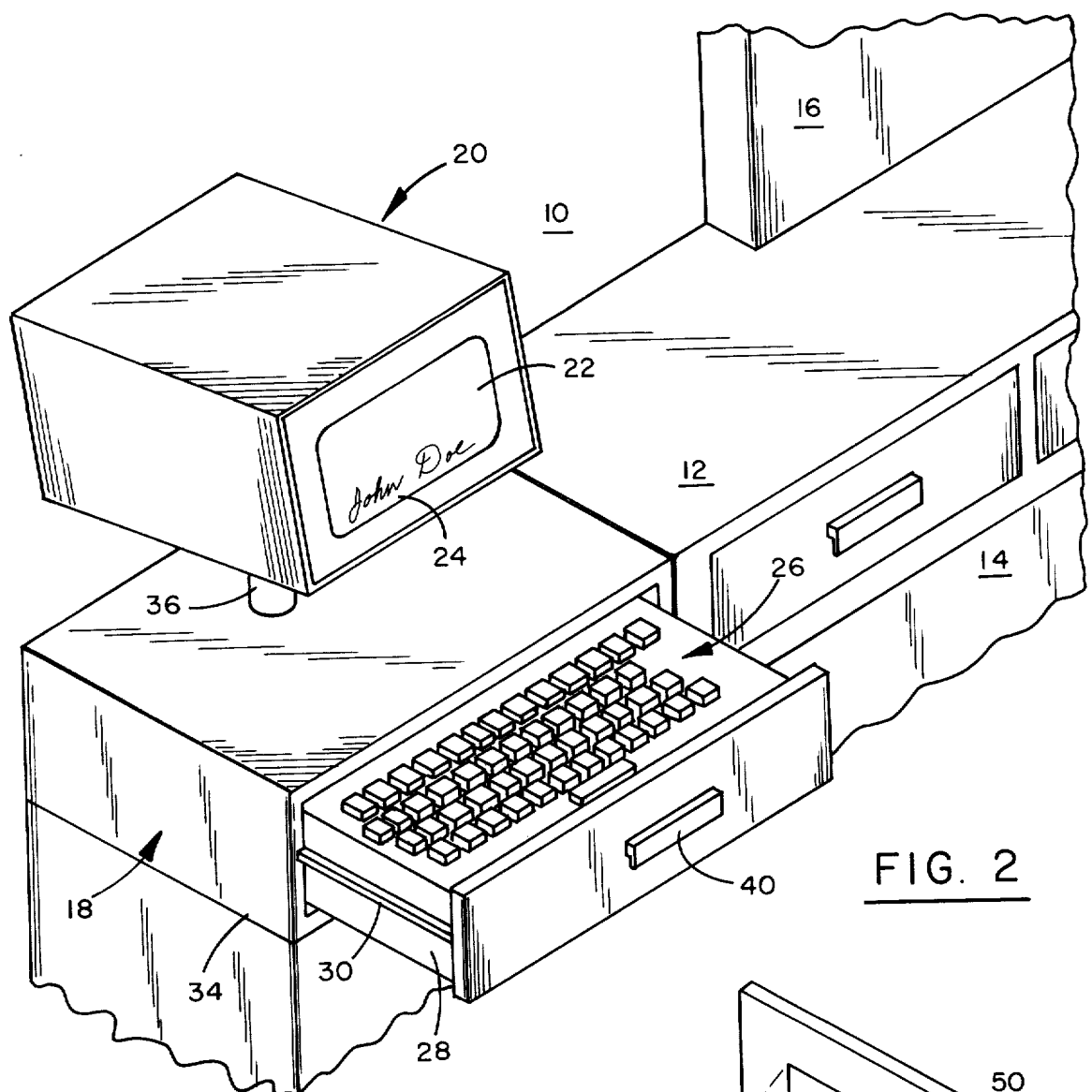
FIG. 2 shows a perspective view of a remote terminal of this invention that can be provided to a user incorporating a keyboard and a CRT for respectively accessing and displaying a signature or other information thereon.
Figure 3:
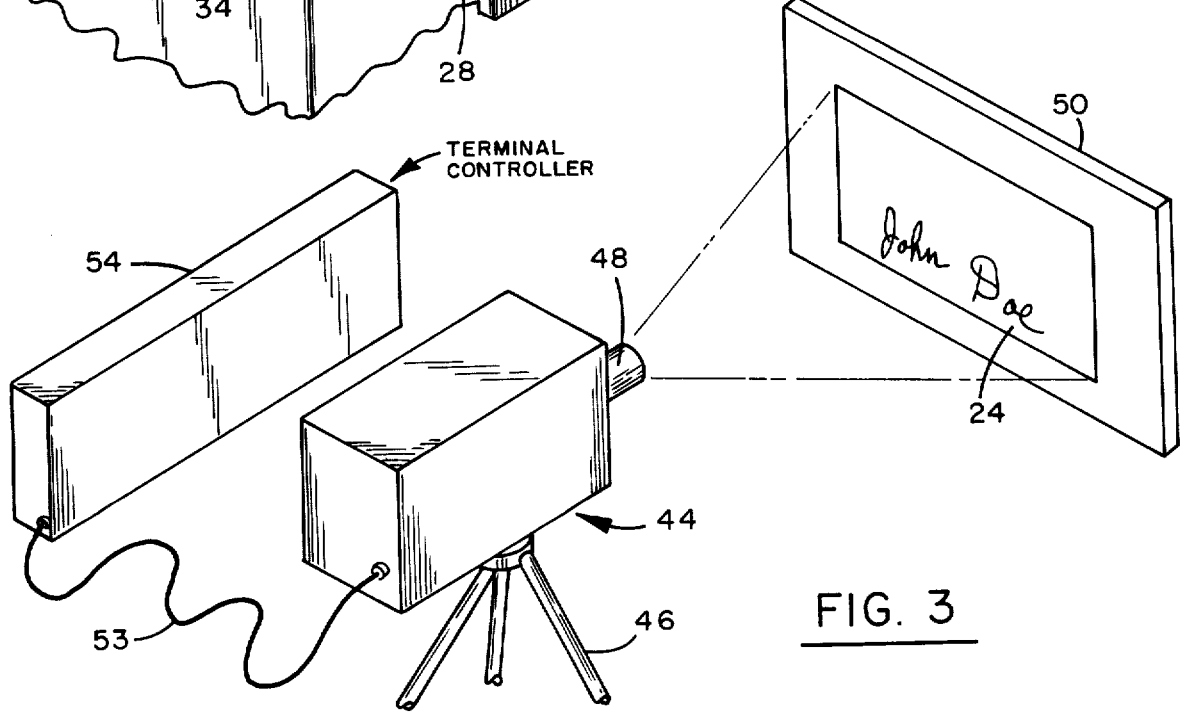
FIG. 3 shows a schematic perspective view of a television camera capturing a signature on a signature card for prospective storage in the disc or other storage means associated with the main central processing unit (CPU) incorporated with this invention.

In this particular instance, a user, namely user 4 shown in the schematic, happens to be a bank teller. The user has the keyboard 26 at keyboard location 4 with a CRT 20 at CRT location 4 all within the given configuration as shown in FIG. 2. For purposes of understanding, the entire bank teller's station has been shown as the area 12 which was previously described as the counter.

In use, a teller or remote point of purchase sales person would take a card 50, insert it within the signature capture means 44, and access the card through the terminal controller or processor 54 by pressing a required access button on the keyboard 26. This also would thereby allow the information on the card 50 to be recorded so that the signature would then be transmitted through the terminal controller or processor 54 to a main central processing unit or CPU.

The recording of the signature 24 at the main CPU memory is performed in a manner which will be expanded upon whereby the signature is compressed to avoid unnecessary storage on the disc storage members. Thus, only specific video information that is required with regard to the specific signature lines without inclusion of all the blanks is recorded on the disc. The information with respect to the blanks is stored by characters corresponding to the number of blanks on the dot matrix of the video screen 22.

After the video signature display information has been stored, any remote location connected to the main CPU can then have a display of the signature 24 on a CRT 20 for verification of the signature. In this manner, anyone utilizing the system, can have a rapid display of the signature in question on any document compared with the actual signature of the individual on file without having to go to a file or verify it through another source, such as a remote branch.

SYSTEM EMBODIMENT

Looking more particularly at the system of FIG. 1, it can be seen that a number of user terminals corresponding with stations of a series of bank teller stations, such as the window 10, are shown. As previously stated, the user at each location corresponds to a location for a new accounts clerk or an area where a teller can also record the signature of the new account.

To reiterate, the user locations 1 through 4 are analogous to a teller location shown within FIG. 2. The keyboards 1 through 4 are analogous to the keyboard 26 that has been shown, while CRT's 1 through 4 are analogous to the CRT 20.

The user locations access the control element, namely terminal controller 54, by means of a special key on the keyboards 26. In order to provide for a proper sequence of user locations being placed in a mode so that they properly address the terminal controller 54 or processor, a keyboard input-output port 60 is shown. The input-output port 60 allows a transmission from keyboards 1 through 4 or any sequence thereof in greater number to be provided in a manner to transmit information to the remote CPU or processor 54.

The remote CPU 54 can be in the form of what is generally referred to as a micro processor having a substantial degree of memory incorporated therein. In the past, such devices have been referred to as mini computers which can also be utilized in this instance. One of the main differences between mini computers and micro processors that is alluded to in the art, but is not necessarily consonant with actuality, is that a mini computer is more readily programmed. Regardless of what type of CPU 54 is utilized, the fact should be understood that it incorporates a certain degree of memory therein. The memory in this particular case provided by the CPU is in excess of twenty four thousand bits (24 K).

The remote CPU 54 also provides control of the signature capture means of the television camera unit 44. The signature capture means 44 is routed through the input-output port 60 for ease of handling through the remote CPU or processor 54. However, it should be understood that the signature capture unit can be accessed directly from the user 4 station by means of a connection which has been shown as a dotted line 64. This effectuates an ability of the user to go directly into the memory of the CPU in either direction.

To provide a buffered display system rather than directly utilizing the memory of the main CPU, a portion of the processor's 54 memory, namely, the memory 8 through 12 K, 12 through 16 K, 16 through 20 K and 20 through 24 K, is used. This allows the remote CPU or processor 54 to control and provide the proper address and characters for creating a CRT display from the input that is received from the main CPU. The other portion of the memory, namely 0 to 8 K is utilized for accessing and control of the system and is dedicated specifically to the configuration of the keyboard CRT locations and general system elements in order to provide operational control. The remote CPU or processor 54 also has what can be called a read only memory in the art and a scratch pad memory. This allows programming to take place in order to accommodate different systems and user configurations, or the accessing of various types of data or other displays.

One of the key features of this system is a display timing means 68 which is utilized for a clocking function of the raster of the respective CRT's 1 through 4. In this manner, alphanumeric information received from the main CPU can be displayed simultaneously on approximately the upper two thirds of the screen 22, while at the same time the signature is displayed on approximately the lower one third. Depending upon the clocking scheme of the display timer 68, the different portions of the CRT screen 22 can be dedicated to alphanumeric and display functions. This is accomplished by the first one hundred and twenty one TV lines being dedicated to alphanumeric information. The synchronized display of the signature therebelow on the remaining sixty four lines is accomplished by a dot matrix configuration on the last sixty four lines that display the signature while the alphanumeric display is dedicated to the signature at the top.

The clock function of the display timing means 68 is particularly advantageous in this situation by allowing the sweep of the CRT to be appropriately clocked to provide the alphanumeric symbols on one particular portion of the screen, while at the same time allowing the lower portion to receive direct video signals from the main CPU that can be placed on the screen to provide a direct showing of a signature.

The remote CPU or processor 54 has an input-output port 70 connected thereto that functions with a time reset switch 72. This provides the ability to reset the system entirely in the eventuality a logical sequence of the operational CPU has not taken place. Thus, if a logical sequence does not evolve out of the prior process, the input-output port 70 can cause a reset of the entire system so that the CPU 54 will be reset to start the entire process again in the eventuality the function is missed or the process is not properly sequenced on a periodic basis of 0.55 seconds, or reasonable time.

The foregoing is designed oftentimes in many systems in order to incorporate a reset of the CPU 54, such as in start-up when there has been no power applied, or in power outages. This thereby avoids the CPU 54 from going into a false acquisition or a command mode that should not exist and thereby resetting it in order to start out where it was with regard to the proper sequence.

A floppy disc arrangement, including a drive and recording system is shown in the form of a floppy drive 76. The floppy drive 76 is attached to the remote CPU 54 so that signatures or other acquired information can be temporarily recorded during the day or at other times. This can occur when the main CPU is either incapable of being used by virtue of the fact that it is loaded with other functions, or it is preferable to transmit the information or use it at a later point in time, such as in off hours. Thus, the floppy drive 76 can be utilized on an interim basis.

In other words, the floppy drive 76 can be used for periodic acquisition and information during the day when the main CPU is substantially burdened with other dedicated functions. It can store the specific signature to be captured of all the new depositors during the day, and then upon command from the main CPU or by an individual, transmit the signature to the main CPU, or any other data, such as balances, or related alphanumeric information recorded thereon. Fundamentally, the floppy drive 76 provides a backup of storage when the main CPU is not functioning or is not to be used.

In order to connect the remote CPU 54 to the main CPU, an input-output port 80 is utilized. Specifically, the input-output port 80 allows information to be transmitted from the main CPU to the remote CPU 54 and also allows access by the remote CPU 54 to the main CPU.

To connect the devices, a modem 82 is connected to the main CPU which has a second modem 84 for allowing the connection of the main CPU to the system for transmitting information to the remote CPU 54. A connection 86 has been shown which represents a connection which can constitute the connection between a branch and a main office, or a remote location that can be a distance of feet to miles from the respective areas of the remote CPU 54 and the main CPU.

A disc storage 88 is shown having other storage means 90 and 92 that can be in the form of any particular magnetic storage, such as magnetic tape. The disc storage 88 is a standard disc drive which receives the data as well as the signature characters for storage under the control of the main CPU. The main CPU, of course, can be any particular computer such as those known in the industry.

An interesting portion of the system involves the timing board, or display timer 68, inasmuch as it allows alphanumeric display functions with a display of a signature on the same CRT individually and simultaneously. The first one hundred and twenty one TV lines of the CRT are dedicated to alphanumeric output from the main CPU, and on the one hundred and twenty second line, a time function causes a display of the stored signature. This is fundamentally caused by a switching of the clocking frequency of the timing board from one scan mode to another, so that the data being received from the remote CPU 54 is shown in two modes.

In other words, the display shows direct video from the memory and the alphanumeric in the form of dot patterns, formed from hexadecimal configurations prior to providing a legible alphanumeric symbol.

Another interesting configuration is that the input-output port 80 provides the ability to take serialized or parallel configured information and use them conjunctively. Fundamentally, it interfaces the CPU 54 with the main CPU to allow material transmission during clocking functions to provide the reorientation of parallel information in the serial configuration for transmission to the main CPU.

One of the main features of this invention is the compression technique for storing a signature. As can be understood, normally the characters that would be directly stored with respect to a signature would include the spaces, as well as lines that appear as the signature 24. In order to accomplish the storage of spaces in the most advantageous manner, a compressive technique is used. In particular, the information which is sent to the main CPU compresses the signature by having each character represent either a positive portion of a line as a positive portion of the signature, or a space or multiplicity of spaces thereafter. Thus, it fundamentally compresses the signature during storage by limiting a series of spaces in a signature to only one character which designates the number of spaces. Upon withdrawal from storage, the spaces are expanded to create the full signature pattern when coming out of storage.

More particularly, the blanks of a signature are not transmitted to memory except in the form of a character that states that there are so many blanks. In other words, the main CPU does not see any pattern that does not have any positive signature display information in it. This is effectuated by actually skipping blanks by indicating the number of blanks on a particular character or bit that relates to a blank or multiplicity of blanks following thereafter. To do this, a one is used to indicate a lighted portion and a zero is used to indicate a blank or unlighted portion of the signature.

In other words, the compression technique relates to shifts in a bit sequence of a plurality of eight wherein each of the bits respectively defines a white or dark area. Thereafter, if a white area on the screen is to be required, a single character is used to indicate how many groups of eight bits of white are required in order to provide the white video display. As can be understood, this is quite helpful, because of the fact that signatures involve substantial white spaces with respect to a minor amount of discrete line formations or dark areas that are to be displayed on the CRT.

The net result is that when the signature is compressed by a certain percentage, the remainder can be left over as spare storage. This thereby saves substantial costs by eliminating the requirement for the storage of spaces in a signature, while at the same time speeding up the process of retrieving the information that relates to the signature from the main CPU.

As annunciated previously, a basic portion of this invention is the use of the TV capture means or camera and the converting of video information into the digital information. This is accomplished by strobing the intensity information into a digital shift register until a byte is accumulated and then transferring that byte into a digital storage means in the form of a CPU. Additionally, it provides a signature display on a one hundred and ninety two by sixty four dot matrix, while the upper portions of the display utilize a diminished dot matrix for each of the alphanumeric portions of the graphic display.

From the foregoing disclosure, it can be seen that this invention substantially incorporates a new system and hardware for accomplishing a signature display and to provide alphanumeric information with the video information. In addition thereto, it provides a compression technique for allowing the storage of non-essential information in a signature or line display, while at the same time providing for the proper scanning of a CRT to present simultaneously direct video or graphic information and alphanumeric information.

As a consequence, this invention should be read broadly over the prior art with regard to remote and central processing locations as to the storage of commercial information and information to be displayed, such as a signature.

We claim:

1. A system for recording, storing and later displaying document information including means for capturing and recording a given document, storing the captured information and displaying the captured information at a CRT terminal in a remote location from said storage location comprising:
   at least one television camera;
   means for providing a document to be viewed by said television camera for capture and storage;
   a CRT for later displaying the document captured by said television camera;
   a processor connected to said television camera for controlling and activating said television camera and formatting the picture provided by said document into digital information;
   means to activate said processor;
   a main central processing unit (CPU) for connection to said processor; and,
   storage means connected to said main CPU for storing the digitized video information corresponding to the document that has been captured by said television camera.

2. The system as claimed in claim 1 wherein said means for activating said processor comprises:
   a keyboard; and,
   said CRT is located in the same facility and connected to said keyboard.

3. The storage system as claimed in claim 2 further comprising:
   a plurality of keyboards connected to said processor having a CRT located in the same facility with each one respectively for displaying information that has been previously recorded by said television camera.

4. The storage system as claimed in claim 3 further comprising:
   an input-output port for controlling the respective plurality of keyboards and CRT's connected to said processor.

5. The storage system as claimed in claim 4 further comprising:
   means to access and provide alphanumeric data to said main CPU for storage in a storage means connected thereto for later display upon command by said keyboards at said respective CRT displays.

6. The storage system as claimed in claim 5 further comprising:
   a display timer for causing a scan of each CRT in a dual function wherein alphanumeric information from said main CPU is displayed on one portion of each respective CRT and the display as captured is shown on the other portion of said CRT simultaneously or with said alphanumeric information.

7. The storage system as claimed in claim 6 further comprising:
   a temporary storage means connected to said processor wherein said temporary information can then be accessed to said main CPU for storage therein.

8. The storage system as claimed in claim 7 further comprising:
   a reset means connected to said processor for resetting the processor to an initial logical step in its programmed sequence when said processor is outside of its normally programmed sequence.

9. The storage system as claimed in claim 1 further comprising:
   means to register a blank space within the video display that has been captured;
   means to apply a single character with respect to a given number of blanks that have been registered by said means in order to store said character indicating said number of blanks of said video display on said storage means connected to said main CPU for later retrieval and display on said CRT of a showing indicating said display with said blanks.

10. The storage system as claimed in claim 9 wherein: said display is a signature from a signature card; and, said blanks that are stored are portions of the signature that relate to non-marked areas therein.

11. The storage system as claimed in claim 10 further comprising:
    means to compress the blanks of a signature to be displayed in the form of a character indicating the number of blanks for storage in said main CPU so that upon access and display by said CRT, the scan of the CRT can effectuate positive dot matrix locations and blank orientation with respect to such signature display thereby expanding the signature to its full size with respect to the blanks related to each character that relate to the signature.

12. A storage system for storing video information related to the signature of a bank customer and later retrieving said signature for display on a CRT at a remote location from said source area comprising:
    a signature capture means in the form of a television camera for viewing a signature card;
    means to access said signature capture means with respect to said card;
    a processor for processing the video information from said television camera connected thereto;
    a main CPU having storage means connected thereto and connected to said processor for receiving and storing the video information; and,
    means to access the information stored by said main CPU in conjunction with a CRT display for displaying the signature that had been previously captured and stored by said processing unit.

13. The system as claimed in claim 12 further comprising access means comprising:
    a plurality of keyboards at respective bank teller locations for providing a display of a signature that had been previously stored in said main CPU and having a CRT located with each keyboard therewith for displaying said signature.

14. The storage system as claimed in claim 13 further comprising:

an input-output port connected between said keyboard terminals and said processor for coordinating keyboard access through said processor to said main CPU.

15. The storage system as claimed in claim 14 further comprising:

a display timing means connected to said processor in the form of a clocking unit connected to said processor and said CRT's to effectuate clocking of the scan of the CRT's.

16. The storage system as claimed in claim 15, wherein alphanumeric material associated with each signature can be stored in the storage means connected to said main CPU; and, said display timing means comprises means to provide alphanumeric information on said CRT screens while at the same time providing a display function of said video information, both of which have been stored within said main CPU.

17. The system as claimed in claim 16 further comprising:

temporary storage means which can be accessed by said main CPU connected to said processor.

* * * * *